United States Patent [19]

Kasahara et al.

[11] Patent Number: 5,123,088
[45] Date of Patent: Jun. 16, 1992

[54] METHOD AND APPARATUS FOR CREATING AND DISPLAYING NAVIGATORS FOR GUIDING TO RELATED IMAGE INFORMATION

[75] Inventors: Hisashi Kasahara, Yokohama; Hideki Koike, Yokosuka; Tsutomu Horikoshi, Yokohama; Yoshinobu Tonomura, Yokohama; Tomio Kishimoto, Yokohama, all of Japan

[73] Assignee: Nippon Telegraph and Telephone Corp., Tokyo, Japan

[21] Appl. No.: 370,968

[22] Filed: Jun. 26, 1989

[30] Foreign Application Priority Data

Jun. 27, 1988 [JP] Japan .................... 63-158904

[51] Int. Cl.⁵ .................................. G06F 15/20
[52] U.S. Cl. ........................... 395/159; 395/161
[58] Field of Search ......... 364/518, 521, 200 MS File, 364/900 MS File; 395/159, 161

[56] References Cited

U.S. PATENT DOCUMENTS

| | | | |
|---|---|---|---|
| 4,479,196 | 10/1984 | Ferrer et al. | 364/900 |
| 4,905,163 | 2/1990 | Garber et al. | 364/513 |
| 4,920,514 | 4/1990 | Aoki | 364/521 |

Primary Examiner—Gary V. Harkcom
Assistant Examiner—Mark K. Zimmerman
Attorney, Agent, or Firm—Pollock, Vande Sande & Priddy

[57] ABSTRACT

Image information units, related with one another in the order of their magnitudes defined for each of a plurality of properties of each image, are prestored in an image information storage and management device. All image information units adjoiningly related by their properties with a main image being displayed on a display are read out of the image information storage and management device, and contracted images of the read-out image information units are displayed as navigators on the display screen, together with the main image.

24 Claims, 11 Drawing Sheets

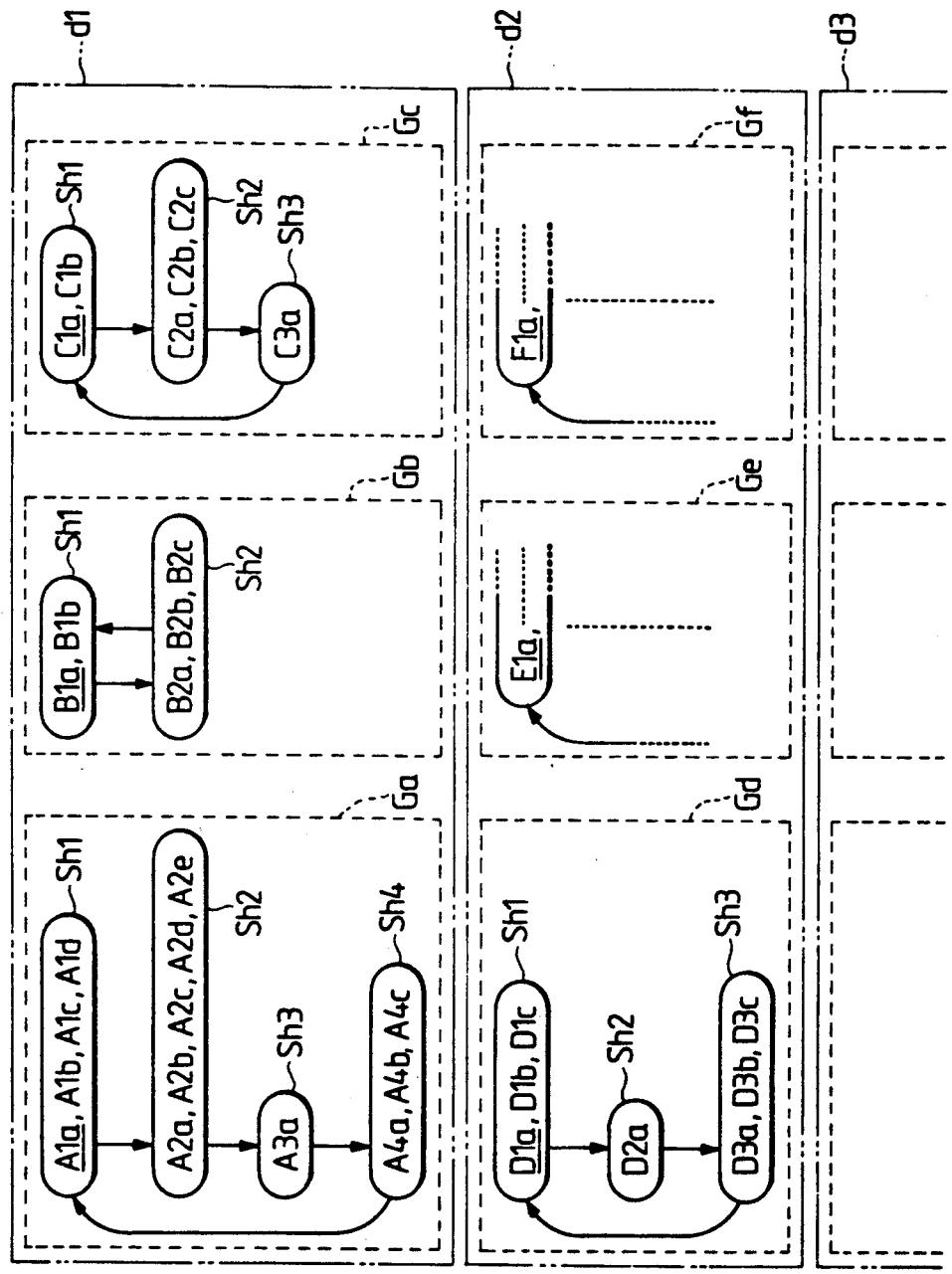

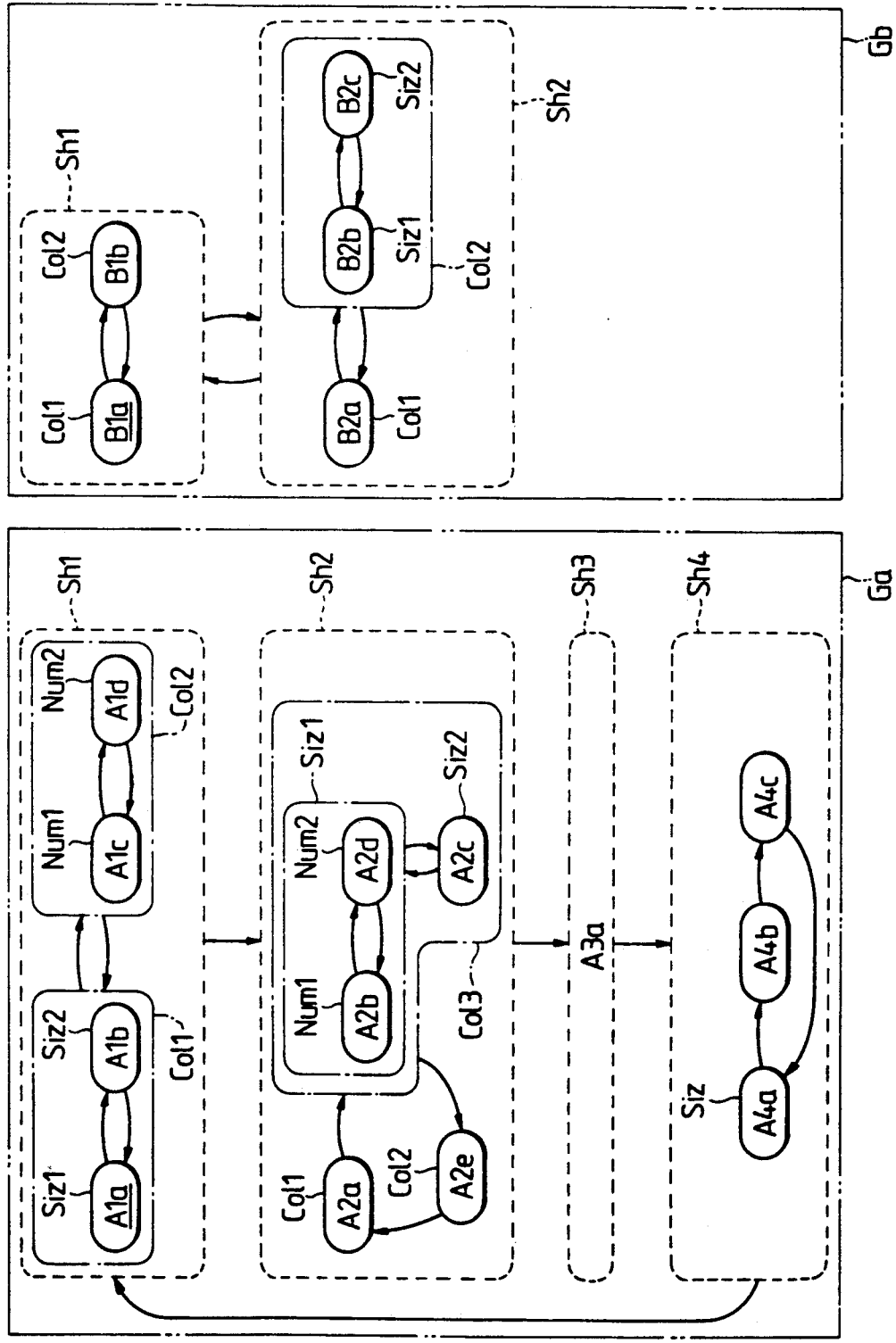

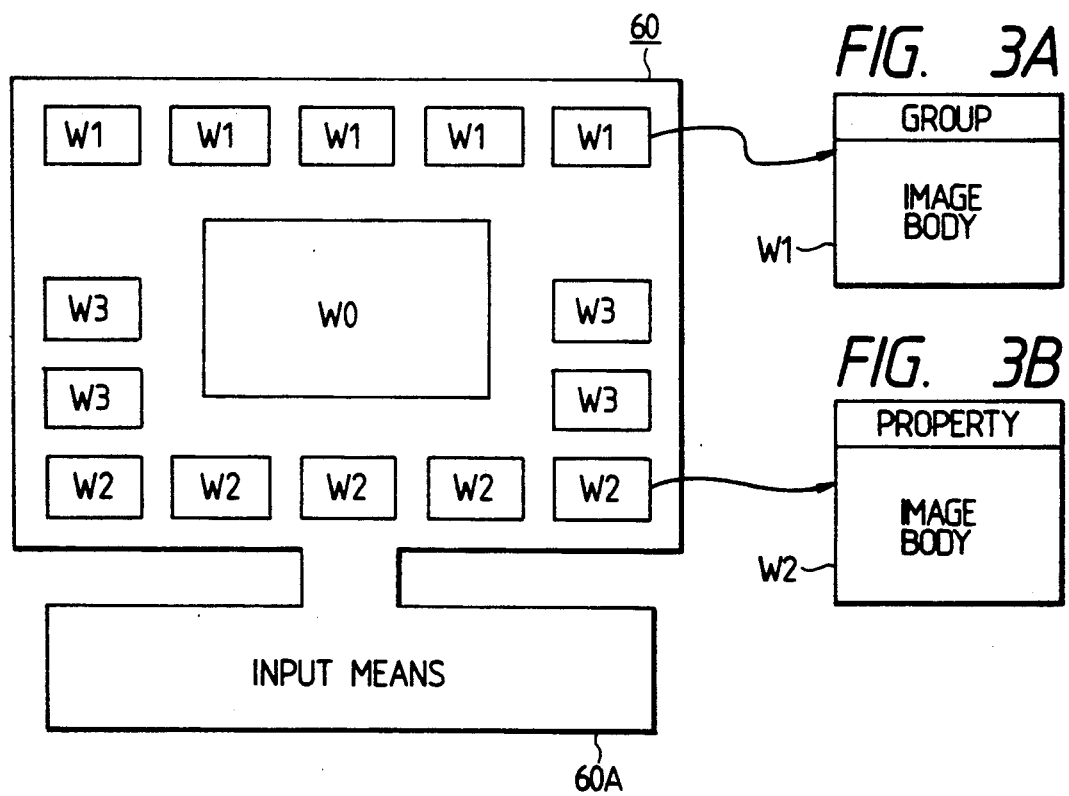

FIG. 4A

TABLE I

| ID | IMAGE INF |
|---|---|
| A1a | IMAGE DATA |
| A1b | IMAGE DATA |
| A1c | IMAGE DATA |
| A1d | IMAGE DATA |
| A2a | IMAGE DATA |
| A2b | IMAGE DATA |
| A2c | IMAGE DATA |
| ⋮ | ⋮ |

FIG. 4B

TABLE II

| GROUP | LINK | ORIGIN | DEST |
|---|---|---|---|
| Ga | Sh | A1a, A1b, A1c, A1d | A2a |
| | | A2a, A2b, A2c, A2d, A2e | A3a |
| | | A3a | A4a |
| | | A4a, A4b, A4c | A1a |
| | Col | A1a, A1b | A1c |
| | | A1c, A1d | A1a |
| | | A2a | A2b |
| | | A2b, A2c, A2d | A2e |
| | | A2e | A2a |
| | Siz | A1a | A1b |
| | | A1b | A1a |
| | | A2b, A2d | A2c |
| | | A2c | A2b |
| | | A4a | A4b |
| | | A4b | A4c |
| | | A4c | A4a |
| | Num | A1c | A1d |
| | | A1d | A1c |
| | | A2b | A2d |
| | | A2d | A2b |
| Gb | Sh | B1a, B1b | B2a |
| | | B2a, B2b, B2c | B1a |
| | | B1a | B1b |
| | | B1b | B1a |
| | | B2a | B2b |
| | | B2c | B2a |
| | Siz | B2b | B2c |
| ⋮ | ⋮ | ⋮ | ⋮ |

FIG. 4C

TABLE III

| DIST | GROUP | IDs OF REPRESENTATIVE IMAGES |
|---|---|---|
| d1 | Ga, Gb, Gc | A1a, B1a, C1a |
| d2 | Gd, Ge, Gf | D1a, E1a, F1a |
| ⋮ | ⋮ | ⋮ |

FIG. 6A  TABLE IV

| OBJECT | DISTRICT | GROUP |
|--------|----------|-------|
| LIGHT | d1: LIVING ROOM | Ga: FROSTED GRASS |
| | | Gb: BELL TYPE |
| | | Gc: WOOD FRAMED |
| | d2: STAIRWELL | Gd: FROSTED GRASS |
| | | Ge: BELL TYPE |
| | | Gf: WOOD FRAMED |
| TABLE | d3: LIVING ROOM | Gh: BRAND |
| | | Gi: |

FIG. 6B  TABLE V

| GROUP | PROP | MAGNITUDE & DIRECTION |
|-------|------|-----------------------|
| Ga | Sh | BALL→OVAL→PANEL→BAR |
| | Col | WHITE→RED→LIGHT BROWN |
| | Siz | 10-40cmφ→40-70cmφ→70-100cmφ |
| | Num | 1→3→5→7 |
| Gb | Sh | BALL→OVAL→PANEL→BAR |

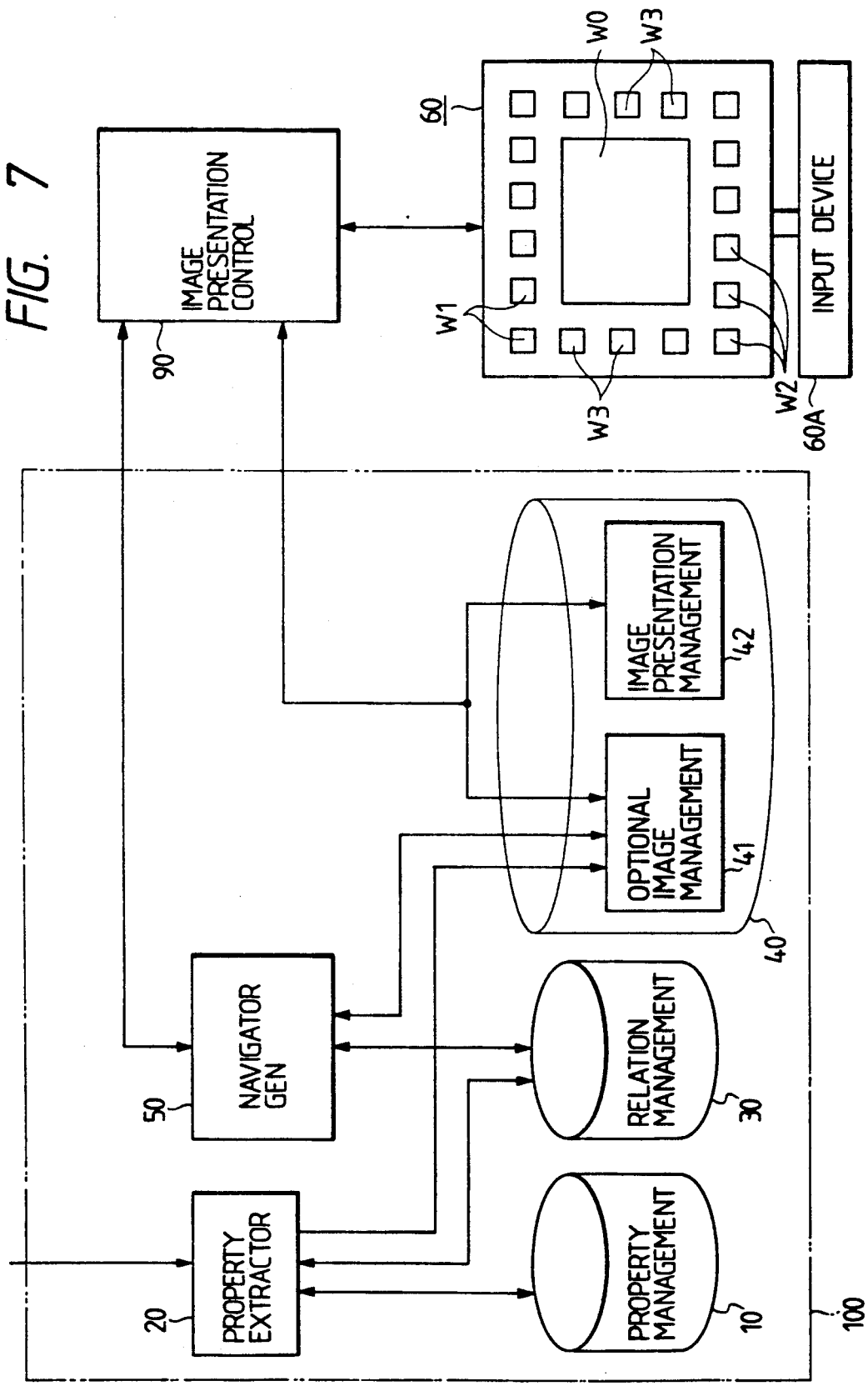

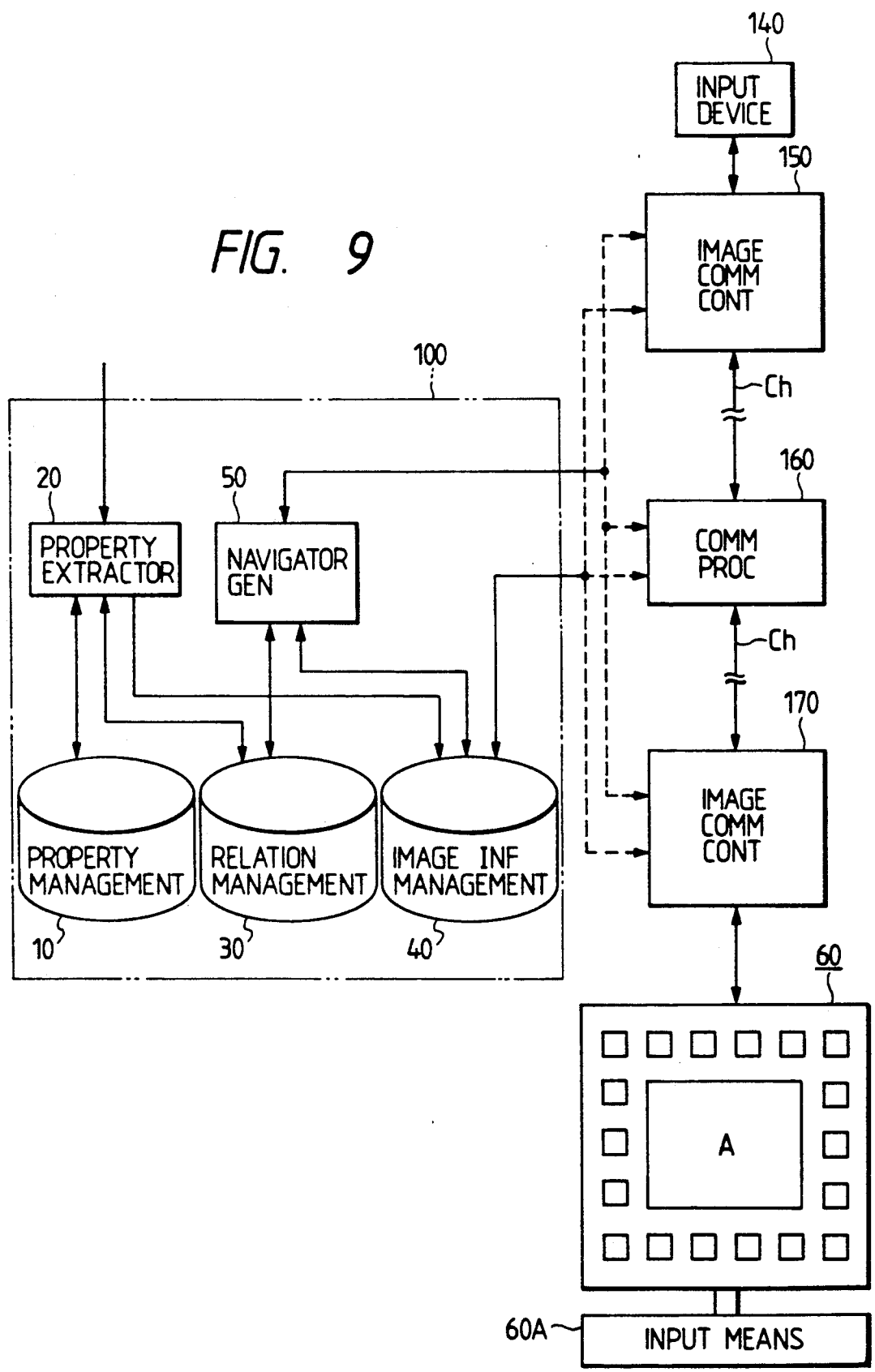

METHOD AND APPARATUS FOR CREATING AND DISPLAYING NAVIGATORS FOR GUIDING TO RELATED IMAGE INFORMATION

BACKGROUND OF THE INVENTION

The present invention relates to a method and apparatus for creating and displaying navigators for guiding to associative and related visual information in an image/multimedia information retrieval, presentation of visual information, visual communication, etc.

For example, in an information retrieval database, all pieces of information are hierarchically sorted from larger to smaller categories in accordance with an arbitrary or predetermined sorting technique. To get target information, a user predicts and specifies the class of the hierarchy to which the information belongs, and reads out all pieces of information in the class in a sequential order to locate the information desired. Alternatively, the database selects the class in accordance with the object name given by the user and sequentially presents all pieces of information in the class to the user. With these methods, however, the user needs to examine, one by one, all the pieces of information in the class until he finds the target information, and hence the recall precision is particularly low when the amount of information in the class is large. In addition, if the user specifies a wrong class, he will not know his error until after he has examined all pieces of information in the class, and he will have to specify again another class to execute the retrieval procedure from the beginning—this will inevitably increase the amount of processing for communication between the user and the database. On the other hand, if a class of a wider category is specified so as to increase the probability of getting the target information, the database will offer a larger amount of information to the user, increasing the amount of work on the part of the user. Thus, the information which the conventional database offers to the user does not always satisfy the user's requirement, and the degree of satisfaction may sometimes differ with users and situations in which they stand. This problem is encountered in an information presentation system and an image communication system employing the aforementioned method as well.

SUMMARY OF THE INVENTION

It is therefore an object of the present invention to provide a method and apparatus for creating navigators which obviate the above-mentioned defects of the prior art and help users judge from image information on a display in selecting their route to desired information, thus providing an efficient navigational aid for locating the target information.

According to the present invention, the order of all pieces of image information are interrelated in directions of their magnitudes defined for respective plural kinds of attributes or properties, and they are stored and managed accordingly. An image for guiding to the closest image information, attribute-related to a main image (which will hereinafter be referred to as a core image as well) being displayed on a display, is created as at least one navigator and is displayed in proximity to the main image.

The user sees the main image and the navigator displayed on the display, judges an attribute direction that is optimum for an access to desired image information, and selectively displays one of such navigators as the next main image. By repeating such operation, the user can efficiently reach the target information.

BRIEF DESCRIPTION OF THE DRAWINGS

FIGS. 1A, 1B and 1C are diagrams for explaining how image information units are related with one another in terms of attributes and their magnitudes in accordance with the present invention;

FIGS. 3, 3A and 3B are diagrams for explaining examples of displays provided on the display screen according to the present invention;

FIGS. 4A is a table for explaining image information units which are stored and managed in an image management device 40;

FIGS. 4B and 4C are tables for explaining image information units which are stored and managed in a relation management device 30;

FIGS. 6A and 6B are tables for explaining image information units which are managed in a property management device 10;

FIG. 7 is a block diagram illustrating an example of the present invention as applied to an information presentation system;

FIG. 9 is a block diagram illustrating an example of the present invention as applied to an information communication system.

DESCRIPTION OF THE PREFERRED EMBODIMENTS

Figure 1C:
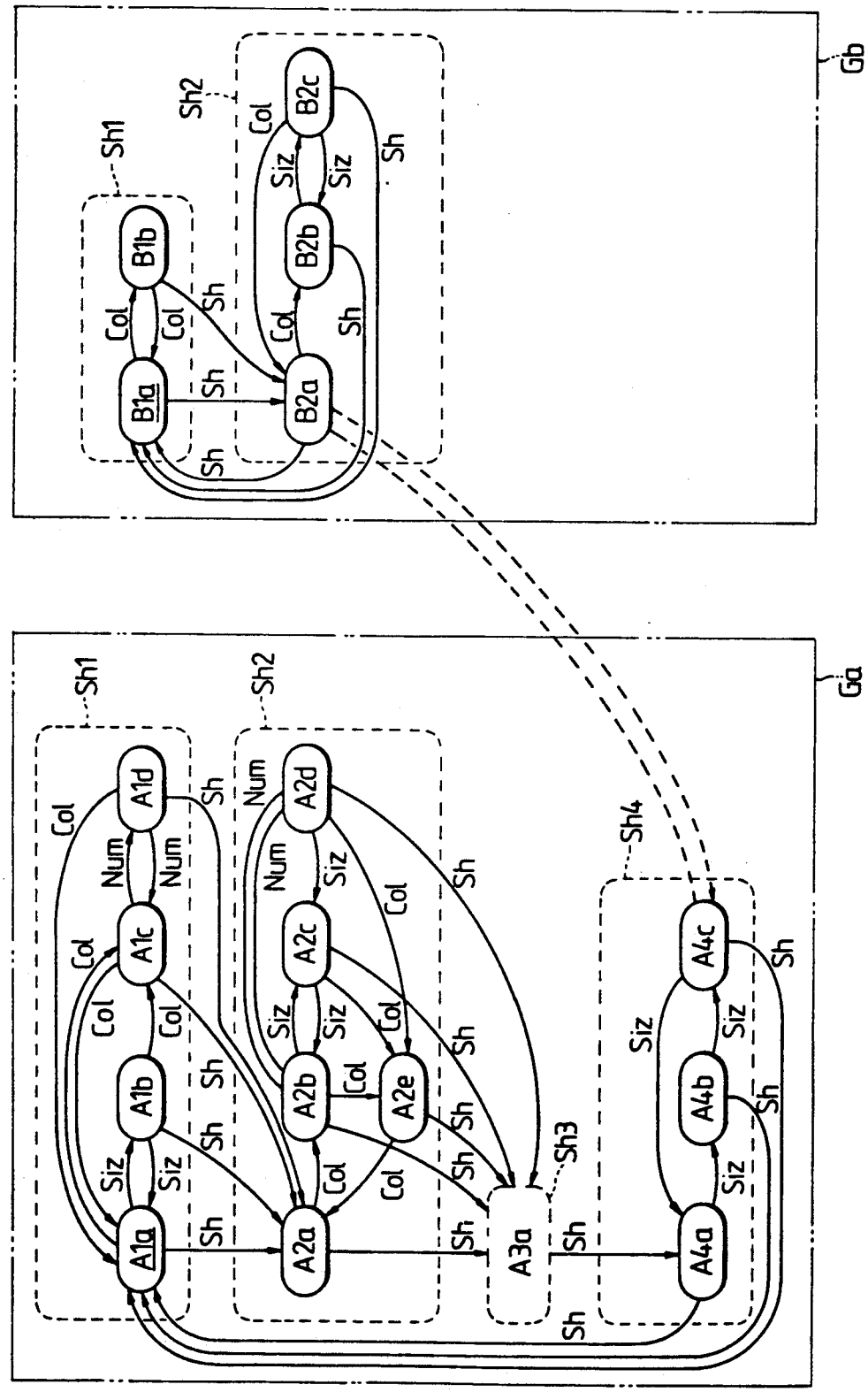

Pieces of image information A1a, A1b, ..., A2a, ... B1a, ..., C1a, ..., (hereinafter referred to as image information units) stored in a database which embodies the method and apparatus for creating and displaying navigators according to the present invention, are classified into groups Ga, Gb, Gc, ..., which are, in turn, classified into districts $d_1, d_2, d_3, \ldots$ of larger categories as shown in FIG. 1A, for instance. In each group the image information units are correlated according to the magnitudes of attributes (i.e. properties) of their images. For example, in a light catalog database, the groups Ga, Gb and Gc belong to the district $d_1$ which is stairwell type lighting equipment, the group Ga being frosted glass lighting equipment, the group Gb bell-shaped equipment, and group Gc wood-framed equipment. The groups Gd, Ge and Gf belong to the district $d_2$ which is lighting equipment for living rooms, and they are frosted lighting equipment, floor lamp equipment, and wood-framed lighting equipment, respectively. The image information units A1a, A1b, ..., A2a, A2b, ..., A3a, A4a, ... in the group Ga are classified into classes of magnitude Sh1, Sh2, Sh3 and Sh4 defined as to the "shape" property, and they are correlated in the order of their defined magnitudes of the property. In addition, both ends of such a series of correlations are related to each other, and consequently, circulative relationships are defined as indicated by links with arrows. For example, the classes Sh1, Sh2, Sh3 and Sh4 represent image information of ball-, oval-, panel- and bar-shaped lighting equipment, respectively. That is to say, the image information units in group Ga are correlated in a sequential order in terms of the "shape" property. In the case where the magnitudes of the property can be represented by numerical values, the image information units are correlated in an ascending (or descending) order of the numerical values. Where such a numerical representation of the "shape" property is difficult as in the case of the lighting equipment mentioned above, a desired order is determined and this order is defined as the magnitude of the property.

It is also possible, if necessary, to classify the image information units in each of the classes Sh1, Sh2, ... using another property which relates them with one another. For example, as shown in FIG. 1B in connection with the group Ga, the information units A2a, A2b, A2c, A2d and A2e in the class Sh2 of the property "shape" are classified into classes of magnitude Co11, Co12 and Co13 of a property "color" and are related with one another. The classes Co11, Co12 and Co13 are white, red and light brown lighting equipment, respectively. The image information units A2b, A2c and A2d in the class Co12 of the "color" property are further classified by magnitude Siz1 and Siz2 of another property "size" and related with one another. Moreover, the image information units A2b and A2d in the class Siz1 of the "size" property are related with each other by magnitudes Num1 and Num2 of another property "number". The "size" and "number" properties are the maximum diameters of the respective lamps and the numbers of light bulbs used in the lamps. The relating of magnitudes in each property is circulating in one direction. In the case of hierarchically classifying and relating image information units by use of a plurality of properties which each image information has, priorities are assigned to the properties in advance and the image information units are incorporated into a hierarchy in accordance with the priority of the property and are classified accordingly. For example, in the lighting equipment of the above-mentioned group Ga, priorities of the properties are in the order of "shape", "color", "size" and "number", and hence the "shape" property is the property of the highest priority (or the widest) category.

FIG. 1C shows an example of an image information relating network for concretely implementing the correlation of the image information in the group Ga depicted in FIG. 1B. This network is designed so that where an arbitrary class of an arbitrary one of the properties is related in FIG. 1B with another class of the same property through an outgoing link, all information units belonging to the former class are related in FIG. 1C via outgoing links with at least one (and one is enough) of the image information units belonging to the latter class. For example, since the class Siz1 of the "size" property in the class Sh2 of the "shape" property in FIG. 1B is related via an outgoing link with the class Siz2 of the same "size" property, the image information units A2b and A2d are both related with the image information unit A2c via outgoing links as shown in FIG. 1C. Conversely, the image information unit A2c of the class Siz2 is related via an outgoing link with only one image information unit in the class Siz1, that is, the image information unit A2b in the example depicted in FIG. 1C. Further, since the class Co12 of the "color" property in the class Sh2 of the "shape" property shown in FIG. 1B is related to the class Co13 of the same "color" property via an outgoing link, the image information units A2b, A2c and A2d are all related with the image information unit A2e via outgoing links as shown in FIG. 1C. Similarly, since the class Sh1 of the "shape" property in FIG. 1B is related with the class Sh2 of the same property via an outgoing link, all the information units A1a, A1b, A1c and A1d of the class Sh1 are related with one of the image information units, A2e, of the class Sh2 via outgoing links as shown in FIG. 1C. The symbols Sh, Col, Siz and Num attached to the links in FIG. 1C indicate the "shape", "color", "size" and "number" properties, respectively. The underlined image information in each of the groups Ga, Gb, ... in FIGS. 1A, 1B and 1C indicates representative image information of the group, as will be described later. Each information unit is composed of a photographic image (an image body) of, for example, a lamp and image control information attached to the image body, such as an identifier, property, property values, etc. Likewise, the image information units of the groups Gd, Ge and Gf in the district d2 are also related with one another in accordance with their attributes or properties and the values thereof, but they are not all shown.

Proximity indexes based on the magnitudes of properties of an image are such, for example, as follows:
(a) Visual properties presence/absence, number (many or few, increase or decrease), shape, posture (vectorial angle), size (long or short, wide or narrow, large or small), position (upper or lower, right or left on the display screen), arrangement (far or near, close or sparse), color (hue, saturation), brightness (luminosity), etc.
(b) Spatial-view properties photographing direction, photographing position, etc.
(c) Temporal properties time (afterward, beforehand, time difference), time (long or short), etc.
(d) Semantic properties category, context, part-whole relation, etc.

The above properties and directions of their magnitudes are merely illustrative, and according to the image content, properties or attributes can freely be defined from various points of view. It must be noted here that a plurality of attributes can be defined for the same image content from different points of views.

Since a common or generally acceptable magnitude (proximity index) cannot be defined for all attributes in practice, proximity indexes suited for individual image attributes are defined. For example, the magnitude of the "shape" property of the aforementioned lighting equipment is defined in the order of ball, oval, panel and bar, as described previously in connection with the group Ga and as indicated by Sh1, Sh2, Sh3 and Sh4 in FIG. 1A. Accordingly, the closest to Sh1 is Sh2 and the farthest is Sh4. However, Sh4 is related with Sh1 so that a circulating relation is established. In contrast thereto, since the magnitude of the common "size" property for relating the image information units A4a, A4b and A4c shown in FIG. 1B can be defined numerically, the image information units are related with one another in an ascending (or descending) order of the value. As to the "shape" property, for example, in the case where three-dimensional shapes which define the respective magnitudes of said property can each be represented, for instance, by a quadratic hyperfunction, it is possible to , define the property magnitudes indicative of the respective shapes by parameters of the function and to rank the image information units according to the values of the parameters.

The image information unit or units closest to a certain image information unit are adjoining image information units to which the certain image information unit is directly connected via outgoing links in a network (hereinafter referred to as an attribute or property network) of image information units related in a direction determined in accordance with the property magnitudes (values) as depicted in FIG. 1C. In other words, the closest image information units refer to all image information units which can be selected from the current position (an image information unit currently displayed as a core image) in the attribute network. For example, in FIG. 1C the image information units A2c, A2d, A2e and A3a are such adjoining image information units for the image information unit A2b. Browsing of image information units can be moved from an arbitrary image information unit to any one of the adjoining image information units in the attribute network.

It is also possible to employ an arrangement in which one image information unit (underlined in FIGS. 1A, 1B and 1C) representing each group is predetermined and the information browing can be shifted not only to an arbitrary one of the adjoining image information units in the same group as mentioned previously but also to such a representative image information unit of an arbitrary one of the other groups in the same district. That is to say, representative image information units of the respective groups in the same district may be added as adjoining image information units. Links for relating to these representative image units are not shown in FIGS. 1A, 1B and 1C for the sake of brevity.

In the present invention, a visual landmark for guiding a certain image information unit to a related one is defined as a related information referring navigator (hereinafter referred to simply as a "navigator"). In concrete terms, the navigator is a reduced image of a related image information unit, for instance. The related image information unit is the adjoining image information unit. The navigator creating and displaying apparatus of the present invention, which will de described next, creates, as navigators, all image information units adjoining a specified one in the attribute network and displays them in a predetermined layout, together with the specified image information to be displayed as a main image (core image). When the image information thus displayed as the core image does not match his intended target information, the user needs only to renew the core image by selecting one of the navigators, and by doing so upon each renewal of the core image, he can browse from one information unit to another in the attribute network in accordance with the image information relating direction so that he will ultimately locate the information desired.

Figure 2:
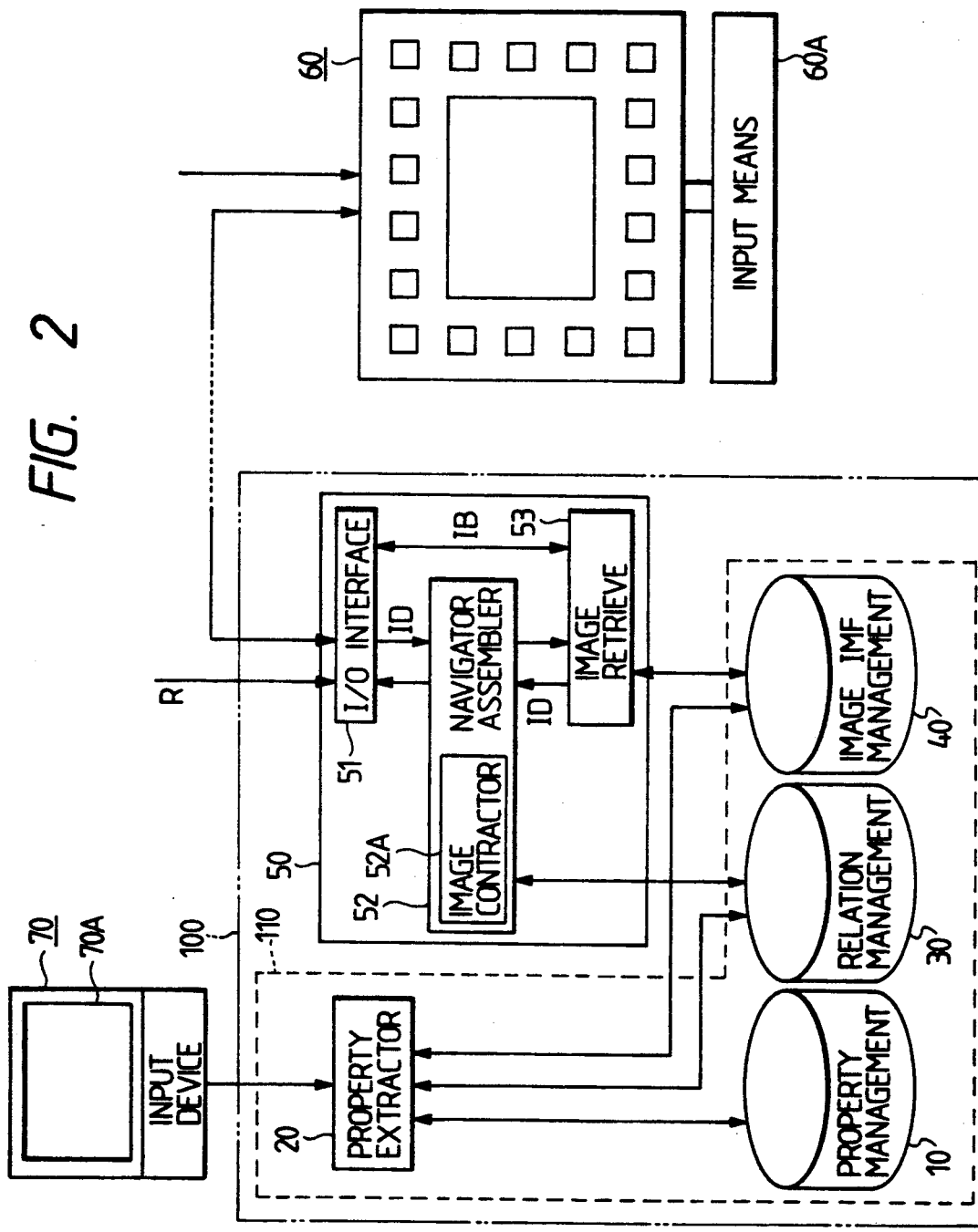
FIG. 2 is a block diagram for explaining an embodiment of the present invention.

FIG. 2 illustrates in block form an embodiment of the navigator generating and displaying apparatus of the present invention. This apparatus includes: an input device 70 for inputting information to be registered; a property management device 10 which stores and manages the kinds of properties and their proximity indexes (i.e. magnitudes) for defining relations of image information units (the properties and the proximity indexes being referred to as property information); a property extractor 20 for extracting the property information from image information units; relation management device 30 for storing and managing the property-oriented relations of the image information units; an image information management device 40 for storing and managing individual image information units and their identifiers; a navigator generator 50 for generating navigators corresponding to an arbitrary core image information unit; and a display 60. The property management device 10, the property extractor 20, the relation management device 30, and the image information management device 40 constitute an image information storing and management section 110, which is combined with the navigator generator 50 to form an image database 100. In the case where the relation management device 30 and the image information management device 40 have prestored therein information necessary for generating navigators, the input device 70, the property management device 10 and the property extractor 20 are not always necessary. The display 60 may be provided near the image database 100 or at a remote location when it is connected via a communication channel to the database 100 as described later.

The navigator generator 50 includes an I/O interface 51 which receives a request for the generation of navigators and outputs the requested navigators, a navigator assembler 52 for assembling navigators, and an image information retrieve section 53 which retrieves from the image information management device 40 image information units corresponding to a retriever. Navigators produced by the navigator generator 50 are output via the I/O interface 51 and presented in a predetermined layout on the display 60. FIG. 3 shows an example of the display layout on the display 60. As will be described later, a selected image information unit is display as the main image in the center window W0 and navigators for guiding to image information units which are closest to the main image are displayed in small windows W1, W2 and W3 surrounding the center window W0.

Next, a description will be given of the operation of the navigator generator 50 shown in FIG. 2. Upon receipt of a navigator generation request R from the outside or display 60, the navigator generator 50 determines, by the I/O interface 51, whether the request is based on an identifier or an image body, and in the case of the identifier, it transfers the identifier ID to the navigator assembler 52. The identifier ID is a code attached to each of the image information units A1a, A1b, . . . A2a, . . . , for example. In the case of the retriever being an image body, the navigator generator 50 transfers the image body IB from the I/O interface 51 to the image information retrieve section 53. The image information retrieve section 53 refers, using the transferred image body IB as a retriever, to an identifier ID versus image information data table, such as shown in FIG. 4A, stored in the image information management device 40, finds an identifier (ID) corresponding to the image information unit which matches with the retriever, and then sends the identifier ID to the navigator assembler 52. Based on the identifier ID received from the I/O interface 51 or the identifier ID from the image information retrieve section 53, the navigator assembler 52 refers to the relation management device 30 and obtains therefrom information necessary for navigator assembling, i.e. identifiers of the adjoining image information units, their properties and the name of the group to which they The relation management device 30 has the attribute network shown in FIG. 1C, for instance, in the form of such a Table II such as depicted in FIG. 4B, for each of the groups Ga, Gb, . . . Table II shows, for each of the attributes or properties and in accordance with their priorities, the relations between the identifiers ID of all destination image information units connected with links of the property (that is, identifiers of all the adjoining image information units) and the identifiers ID of all image information units which have links leading to the same destinations, respectively. For instance, when supplied with A1a as the identifier ID, the navigator assembler 52 searches Table II of FIG. 4B in the relation management device 30 for an identifier A1a first among the origin IDs of the link Sh of the "shape" property, thereby obtaining the corresponding destination ID. In this instance, the destination ID is A2a. Next, the navigator assembler 52 searches for the identifier A1a among the origin IDs of the link Col of the "color" property to obtain A1c which is the corresponding destination ID. Similarly, navigator assembler 52 obtains a destination A1b for the "size" property. As for the "number" property, there is no link Num which originates from the identifier A1a. In this way, the navigator assembler 52 responds to the identifier A1a to read out from the group Ga in Table II identifiers A2a, A1c and A1b of the adjoining image information units which are destinations, and their "shape", "color" and "size" properties. In this embodiment, the relation management device 30 further has a Table III, such as shown in FIG. 4C, which shows the relations between each district and identifiers of representative image information units of all groups which belong to the district. It is also possible, in this case, to employ an arrangement in which, for example, identifiers A1a, B1a and C1a of representative image information units of all the groups Ga, Gb and Gc in the district $d_1$ to which an image information unit corresponding to the identifier A1a provided to the navigator assembler 52 belongs are read out of Table III and representative image information units corresponding to the read-out identifiers are used as adjoining image information units as well.

The navigator assembler 52 transfers to the image information retrieve section 53 all the adjoining image information unit identifiers A2a, A1c, A1b and A1a, B1a, C1a obtained for the input identifier A1a. The corresponding adjoining image information units are read out of the image information management device 40 and their image bodies are contracted by an image contractor 52A in the navigator assembler 52. These contracted images are each appended with the property or group name of the corresponding adjoining image information unit previously read out of the relation management device 30 and assigned the navigator identifier. Further, each contacted image is appended with a flag, as navigator control information, which indicates whether the navigator is a navigator to the representative image information unit or property-related adjoining image information unit ("1" for the former and "0" for the latter, for instance), thereby creating navigator information. The navigator information thus produced is sent via the I/O interface 51 to the display 60 and is displayed thereon in a predetermined layout.

In the display 60 it is checked whether the flag of the navigator information is "1" or "0", and if it is "1", then it is determined that the navigator information is a navigator to the representative image information unit, and it is displayed in one of the upper small windows W1 shown in FIG. 3. If the flag is "0", then it is determined that the navigator information is a navigator to the adjoining image information units related by the property links, and it is displayed in one of the lower small windows W2. In the case of the former, the navigator image body and the name of the group to which the representative image information unit indicated by the navigator belongs are displayed as shown on an enlarged scale in FIG. 3A. In the case of the latter, the navigator image body and the kind of property in which the origin image information unit is related with the adjoining image information unit indicated by the navigator are displayed as shown on an enlarged scale in FIG. 3B.

The display 60 has input means 60A. By specifying one of the navigators displayed on the display 60 through the input means 60A, the identifier of the specified navigator can be provided, as a request R to create new navigators, to the navigator generator 50. That is, the navigator generation request R may be provided not only from the outside but also from the display 60. The main image which is displayed in the center window W0 of the display 60 may be supplied from the outside but may also be one that is read out of the image information management device 40.

Figure 5:
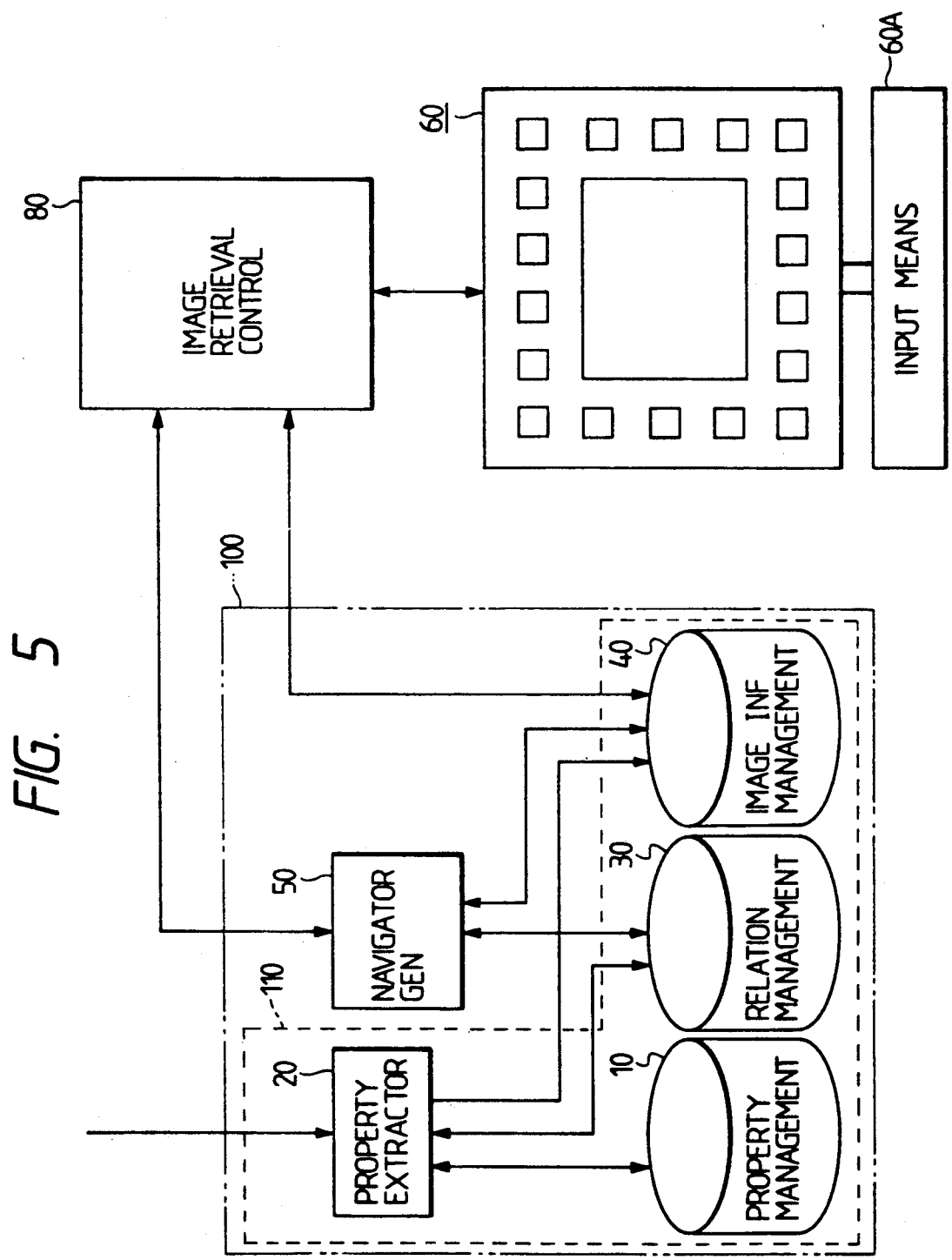
FIG. 5 is a block diagram illustrating an example of the present invention as applied to an information retrieval system.

Turning next to FIG. 5, an embodiment of an image information retrieval system which employs the navigator creating and displaying apparatus of the present invention will be described using the display layout shown in FIG. 3 and the attribute network shown in FIG. 1C. The retrieval system has an arrangement in which the navigator generator 50 and the image information management device 40 of the image database 100 in the navigator creating and displaying apparatus of FIG. 2 are connected to the display 60 via an image retrieval control unit 80. The display 60 is provided with the input means 60A for inputting therethrough image signals and control signals. The user inputs through the input means 60A of the display 60 an identifier, for example, A1a of preknown image information which is at least in the same district as an image content desired to retrieve, for instance, lighting equipment. The identifier A1a thus input is sent to the image retrieval control unit 80, from which it is sent to the navigator generator 50 of the image database 100 to request the generation of navigators.

The navigator generator 50 creates navigators corresponding to the adjoining image information unit A2a, A1c and A1b for the identifier A1a and the representative image information units A1a, B1a and C1a in the same district $d_1$ in the same manner as described previously in connection with FIG. 2. The navigators thus created are provided to the display 60 via the image retrieval control unit 80. The image information management device 40 sends via the image retrieval control unit 80 to the display 60 the image information unit corresponding to the identifier A1a. In the display 60 the image information unit A1a corresponding to the identifier A1a specified by the user is displayed as a core image in the center window W0 of the display screen shown in FIG. 3 and the navigators received from the image retrieval control unit 80 are each displayed in any one of the small windows W1, W2 and W3 arranged around the center window W0. In the following description the identifier of the navigator to an arbitrary image information unit, for example A1a will be indicated by a1a with the first letter "A" of the identifier A1a changed to a small letter "a". Moreover, the identifier of the navigator to each representative image information unit will be hyphened with a flag "1" and the identifier of the navigator to each of the property-related adjoining image information units will be hyphened with with a flag "0". For instance, the navigators a1a-1, b1a-1 and c1a-1 to the representative image information units A1a, B1a and C1a are displayed in three of the upper small windows W1 and the navigators a2a-0, a2c-0 and a1b-0 to the adjoining image information units A2a, A1c and A1b are displayed in three of the lower small windows W2.

The navigators a2a-0, a1c-0 and a1b-0 currently displayed in the small windows W2 show the adjoining image information units A2a, A1c and A1b with which the image information unit A1a of the group Ga in FIG. 1, currently displayed as the core image in the center window W0, is related in terms of the "shape", "color" and "size" properties, respectively, and to which the group Ga, as will be seen from the attribute network shown in FIG. 1C or Table II shown in FIG. 4B. The navigators a1a-1, b1a-1 and c1a-1 displayed in the small windows W1 show the representative image information units A1a, B1a and C1a of the groups Ga, Gb and Gc in the same district $d_1$ to which the image information A1a can be switched next. Accordingly, a total of six navigator images are displayed, and by selecting an arbitrary one of them, the selected image information unit can be displayed as the core image in the center window W0.

Assume that the user selects, for example, the navigator a1b-0 displayed in the window W2. The identifier A1b of the image information unit corresponding to the navigator a1b-0 is sent from the display 60 to the navigator generator 50 via the image retrieval control unit 80. The navigator generator 50 creates navigators a2a-0, a1c-0, a1a-0, a1a-1, b1a-1 and c1a-1 corresponding to the identifier A1b in the same manner as mentioned previously, as will be seen from Table II in FIG. 4B, and the navigator generator 50 sends these navigators to the image retrieval control unit 80. On the other hand, the image retrieval control unit 80 reads out of the image information management device 40 the image information unit A1b corresponding to the identifier A1b.

The navigators a2a-0, a1c-0, a1a-0, a1a-1, b1a-1 and c1a-1 thus produced and the image information unit A1b are sent from the image retrieval control unit 80 to the display 60, wherein the navigators a2a-0, a1c-0 and a1a-0 are displayed in the lower small windows W2, the navigators a1a-1, b1a-1 and c1a-1- in the upper small windows W1 and the image information unit A1b in the center window W0. Then, if the user selects the navigator b1a-1 to the representative image information unit B1a displayed in the window W1, the image information unit B1a will be likewise displayed in the center window W0, and at the same time, reduced images of the image information units B1b and B2a are displayed as navigators b1b-0 and b2a-0 in the lower small windows W2 as seen from the attribute network of the group Gb in FIG. 1C. The navigators which are displayed in the upper small windows W1 are again navigators a1a-1, b1a-1 and c1a-1 to the representative image information units A1a, B1a and C1a in the same district $d_1$ as in the above.

As described above, according to the present invention, image information units are grouped with desired categories and image information units in each group, are classified into a plurality of classes according to their magnitudes of the highest priority property, and are related in the direction of order of the magnitudes. Further, the image information units in each class are classified according to their magnitudes of the second-highest priority property and are related in the direction of the magnitudes. Thereafter, similar grouping of the image information units according to the magnitudes of lower priority properties and relating of the image information units in one direction in each of the respective classes are repeated as required. Since navigators which represent the image information units adjacent, in the outgoing direction, from an arbitrary one of the image information units correlated in the direction of the magnitudes of each property are all displayed as navigators related to the core image, the user can decide which navigator should be selected for accessing the desired image information unit, taking into account the core image being displayed and the kinds of the properties of the navigators related with the core image and the directions of their magnitudes. Accordingly, the user can efficiently search the image database for the image information unit desired. In the case where image information units, each representing one of a plurality of groups in a district defined by a desired condition, are also displayed as navigators as described previously, an arbitrary image information unit in an arbitrary group in that district can easily be switched to the representative image information unit of an arbitrary one of the other remaining groups in that district.

With the attribute network for use in the present invention, the freedom of retrieval can be further enhanced by directly relating arbitrary information units, for example, A4c and B2a in different groups Ga and Gb as indicated by the broken-lined arrows in FIG. 1C. In such an instance, the navigator to a different group, for instance, the navigator b2a to the image information unit B2a for the core image A4c is displayed in, for example, one of left-hand small windows W3 on the display screen depicted in FIG. 3.

Now, a description will be given of a procedure for registering new image information in the image information management device 40. When a registration request and the name of the image object to be registered, for example, "lighting equipment", are input into the property extractor 20 from the input device 70 shown in FIG. 2, the property extractor 20 sends the name "lighting equipment" to the property management device 10. The property management device 10 has a table such as Table IV shown in FIG. 6A in which there are written the names of the image objects and the kinds of districts $d_1$, $d_2$, ... and the kinds of groups Ga, Gb, ... which are selectable for each image object, and a table such as Table V shown in FIG. 6B in which are written the kinds of properties Sh, Col, ... listed in accordance with their priorities in each group and the magnitude indexes of the properties. The kinds of districts $d_1$, $d_2$, ... and the kinds of groups Ga, Gb, Gc, Gd, Ge and Gf corresponding to the image name "lighting equipment" are read out of Table IV and sent via the extractor 20 to the input device 70, wherein they are displayed on its display 70A. When the group to which the new image to be registered is to belong is not included in the groups Ga to Gf in the districts $d_1$ and $d_2$ being displayed, an operator creates and adds a new group to a suitable one of the districts $d_1$ and $d_2$ in Table IV of FIG. 6A, defines properties of the new image and their magnitudes and adds them to Table V of FIG. 6B, and further, he creates a new identifier for the new image and adds it to Table I, II and III of FIGS. 4A, 4B and 4C.

If the group to which the new image is to belong is included in the groups Ga to Gf, then the operator selects the group, for example, Ga through the input device 70, in consequence of which the property extractor 20 reads out first the property "shape" and its magnitudes from Table V of FIG. 6B in the relation management device 10 in accordance with the priorities of the properties "shape", "color", "size" and "number" in the group Ga. The property "shape" and its magnitudes thus read out are displayed on the display 70A. At the same time, relations provided by the links Sh of the corresponding property "shape" in the group Gb are all read out of the relation management device 30 and are displayed on the display 70A of the input device 70. Then the operator judges to which of the four classes of magnitudes of the displayed property "shape" (four classes written on four lines in the property Sh in Table II) the magnitude of the property "shape" of the new image belongs. If such a class is not found, the operator determines at which position in the predefined direction of magnitudes of the property "shape" a new class Sh5 is to be inserted, and writes into Table II the relation between an identifier which is assigned to the new image and the identifier of a destination image information unit to which the new image is connected via an outgoing link. Finally, the operator writes the new image information unit and its identifier into the image management device 40 from the input device 70 via the property extractor 20, thus completing the registration procedure.

If the class to which the magnitude of the property "shape" of the new image belongs is found among the above-mentioned four classes, the operator adds to that class, for example, Sh1, the identifier assigned to the new image. The property extractor 20 then reads out the property "color" of the next highest priority and its magnitudes from Table V of FIG. 6B and displays them on the display 70a of the input device 70. At the same time, the property extractor 20 reads out all relations provided by the links Col of the property "color" from Table II of FIG. 4B and displays, them on the display 70A of the input device 70. The operator judges whether or not it is appropriate to use the property "color" for relating the new image and if yes, then the operator judges to which of the classes Co11 and Co12 of magnitudes of the property "color" the magnitude of the new image information unit belongs, the classes Co11 and Co12 containing the same identifier as that of an arbitrary one of the other image information units in the class Sh1 to which the new image information unit was determined to belong for the property "shape". If no appropriate class is found, the operator creates a new class of the property "color" and writes into Table II the identifier of the new image information unit and the identifier of a destination which originates therefrom. Further, the operator writes the new image information unit and its identifier into the image information management device 40 via the I/O device 70, thus completing the registration of the new image information unit in terms of the property "color".

If the magnitude of the new image information is found to belong to either one of the above-mentioned classes Co11 and Co12, the operator additionally writes the identifier of the new image information unit into the corresponding class of the property "color" in Table II and then proceeds to the next relating step for the property "size". When the operator judges that the above-mentioned relating of the new image information unit is not appropriate, he issues to the input device 70 a command for proceeding to the relating of the new image information unit in terms of the property "size". Thereafter, a series of similar steps takes place for relating the new image information unit with the other pre-registered image information units in conjunction with each of the properties "size" and "number". In the above registration procedure, upon completion of the write into Table II on the input display 70A for each property, the property extractor 20 renews Table II in the relation management device 30 accordingly. In this way, the new image information unit is registered.

The above-described image information unit registration procedure is not limited specifically to the embodiment of FIG. 5 but is applicable as well to other embodiments of the invention described later. It is evident that the display 60 with the input means 60 can be used also as the input device 70.

FIG. 7 illustrates an example of an image information presentation system which utilizes the navigator creating and displaying apparatus of the present invention. This system successively offers a predetermined sequence of basic image information to users and selectively displays optional image information related to a displayed image in which they are interested. The fixed sequence of basic image information units are prestored, in correspondence with their identifiers, in an image presentation management section 42 in the image information management device 40, and optional image information units related to each of the basic image information units are prestored, in correspondence with their identifiers, in an optional image management section 41.

Figure 8:
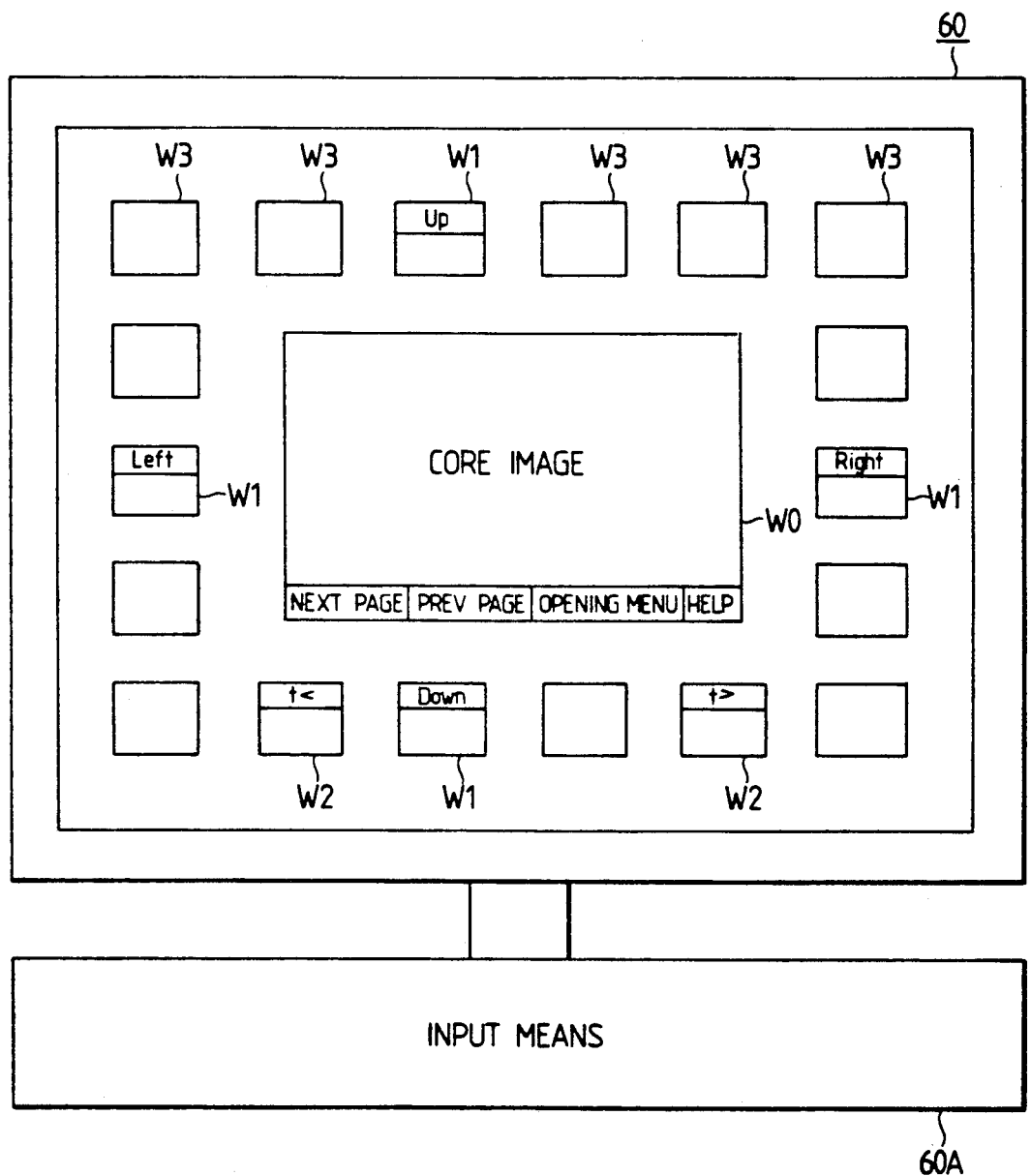
FIG. 8 is a diagram for explaining examples of displays provided on the display screen in the information presentation system.

Upon each readout of the basic image information units one by one from the image presentation management section 42, an image presentation control device 90 supplies the read-out image information unit to the display 60, wherein it is displayed in the center window W0. At the same time, the image presentation control device 90 provides the identifier of the displayed image information unit to the navigator generator 50 to request the generation of navigators. As in the case of FIG. 2, the navigator generator 50 reads out one or more identifiers of adjoining optional image information units for the received identifier from a table in the relation management device 30, the table being similar to Table II shown in FIG. 4B. Then the navigator generator 50 uses the read-out of one or more identifiers to read out one or more corresponding optional image information units from the optional image management device 41 and assembles them into navigators, thereafter sending them to the image presentation control device 90. The image display control device 90 provides the navigators to the display 60, wherein they are displayed in predetermined ones of the small windows W1, W2 and W3. In this fashion, the sequence of basic image information units are displayed one by one at predetermined time intervals, together with the navigators to the optional image information units related with the basic image information unit being displayed. For example, in the case where images of a table viewed from above, bottom, right and left are used as optional images, four navigator images are displayed in upper, lower, right-hand and left-hand small windows W1 in the display screen, together with descriptions of their properties such as "top", "bottom", "right-hand", and "left-hand", respectively. In the case where a woman's dress on a fashion model is displayed, a sequence of basic images are prepared, and at the same time, a sequence of images of the model walking are prepared as optional images. When each of the basic images is displayed as a core image, optional images immediately before and after the core image are displayed as navigators, for example, in two small windows W2 in the display screen depicted in FIG. 8, together with symbols t< and t> representing the direction of the temporal relation. According to the property, navigators may be displayed in predetermined small windows as mentioned above. It is also possible to provide a mode in which, when a command of selecting the front or next page is issued by the user to the image presentation control device 90 via the input means of the display 60 during the display of one of the basic images as the core image, the immediately preceding or succeeding basic image in the sequence can be displayed as the core image.

When the user wants to see an optional image related to a certain basic image being displayed on the display 60, he needs only to input into the input device 60A an instruction of selecting the corresponding navigator on the display screen. When supplied with the selecting instruction, the image presentation control device 90 stops the sequential readout of the image presentation management device 42 and reads out therefrom the specified optional image information unit and sends the identifier of the selected navigator to the navigator generator 50, causing it to produce navigators to other optional image information units related with the selected optional image information unit. While the selected optional image information unit is displayed as the core image, the original basic image corresponding to the selected optional image information unit is displayed as one of the navigators, thereby enabling the user to easily switch the display of the selected optional image information unit to the display of the original basic image information unit corresponding thereto.

In FIG. 9 there is illustrated an embodiment of the navigator creating and display apparatus of the present invention as being applied to an image communication system in which the image database 100 and the display 60 are disposed at remote locations or at the same location. In this embodiment, the transmitting side includes an input device 140 and an image communication control unit 150, and the receiving side includes an image communication control unit 170 and the display 60 provided with the input means 60A. Further, at least one image database 100 forming the navigator creating and display apparatus of the present invention is provided. The transmitting side and the receiving side are interconnected by a channel Ch via a communication processing unit 160 acting as a relay station. The broken lines from the image database 100 to the image communication control unit 150 on the transmitting side, the communication processing unit 160 and the image communication control unit 170 on the receiving side indicate that the image database 100 can be provided in any one of the transmitting side, the relay station and the receiving side. The transmitting side and the receiving side may also be connected directly, omitting the communication processing unit 160.

Where the image database 100 is provided in association with the image communication control unit 150 of the transmitting side in FIG. 9, the image communication control unit 150 receives an image information unit A from the input device 140 and requests the navigator generator 50 to create navigators to image information units related to the image information unit A. The navigator generator 50 produces navigators to the image information units related to the image information unit A in the manner previously described in respect of FIG. 2 and supplies them to the image communication control unit 150 of the transmitting side. The image communication control unit 150 transmits the received navigators and the image information unit A via the communication processing unit 160 to the image communication control unit 170 of the receiving side, in which they are displayed in a predetermined layout on the display screen of the display 60. Accordingly, a desired one of the related image information units in the image database provided in the transmitting side is accessible from the receiving side based on the image information unit A and the navigators to the image information units related thereto being displayed on the display 60. By returning the identifier attached to the selected navigator to the transmitting side, the related image information unit specified as a core image in the receiving side and new navigators are produced by the image database 100 in the transmitting side and then are transferred to the receiving side.

Where the image database 100 is connected to the communication processing unit 160, the latter requests the former to produce navigators to image information units related to the image information unit A sent from the transmitting side and transmits the navigators obtained from the image database 100 to the receiving side, together with the image information unit A. Also in this case, a desired one of the related image information units in the image database 100 provided in association with the communication processing unit 160 is accessible from the receiving side, based on the image information unit A and the navigators displayed on the display 60.

Where the image database is provided in association with the image communication control unit 170 on the receiving side, the image database provided on the receiving side can be accessed for a desired image information unit related to the image information unit A sent from the transmitting side.

While in the above the transmitting side has been described to send the image information unit A, an identifier A may also be input from the input device 140 on the transmitting side in place of the image information unit. Also in such an instance, the identifier A is provided to the navigator generator 50 to produce navigators to related image information units, the image information unit corresponding to the identifier A is read out of the image information management device 40, and the read-out image information unit corresponding to the identifier A and the navigators created by the navigator generator 50 are displayed on the display screen of the display 60 on the receiving side. Accordingly, a desired related image information unit in the image database 100 is accessible from the receiving side.

As described above, according to the present invention, image information units are related with one another for each property or attribute in the direction of order of their magnitudes in the property, and navigators to all image information units, which adjoin a displayed main image in the above relating direction, are displayed together with the main image, so that the user can judge which of the navigators should be selected for displaying the corresponding image information unit next as the main image so as to reach the desired image information unit. In addition, since the image information units related with the main image are displayed as navigators, it is very likely that the user will come across information initially unexpected, but very valuable for him.

It will be apparent that many modifications and variations may be effected without departing from the scope of the novel concepts of the present invention.

What is claimed is:

1. A method for creating and displaying navigators to related image information units by use of image information units related with one another in the order of their magnitudes defined for each property of each image and stored and managed in image information storage and management means, said image information units stored and managed in said image information storage and management means being divided into a plurality of groups by an arbitrary criterion, and said image information units in each of said groups being related with one another for each of a plurality of preselected properties of predetermined priority for each said property, said method comprising the steps of:

displaying a first image information unit as a main image on a display;

reading out of said image information storage and management means all second image information units adjoining said first image information unit in said directions and related therewith;

processing said read-out second image information units and producing, as said navigators, the processed image information units representing said second image information units; and displaying said navigators on said display, together with said first image information unit as said main image;

whereby said navigators of said second image information units related to said first image information unit are displayed to indicate that said second image information units are selectable as a next main image.

2. The method of claim 1, wherein a predetermined one of said image information units in each of said groups stored in said image storage and management means is defined as a representative image information unit of said each group, and said step of reading out said second image information units from said image information storage and management means is a step in which all adjoining image information units which are related with said first image information unit by each of said properties in the same group as that of said first image information unit and said representative image information unit of at least one of said groups which are different from the group of said first image information unit are read out as said second image information units related with said first image information unit.

3. The method of claim 1 or 2, wherein said step of producing said processed image information units as said navigators includes a step of contracting said image information units read out of said image information storage and management means.

4. The method of claim 1 or 2, wherein said step of producing said processed image information units as said navigators is a step in which information indicating a property by which said first image information unit is related with said second image information units is added to the display of said navigators which are image information units obtained by contracting said second image information units read out of said image information storage and management means.

5. The method of claim 2, wherein said step of producing said processed image information units as said navigators is a step in which information indicating a group of said representative image information unit of at least one group different from that of said first image information unit and related therewith is added to the display of said navigators which are image information units obtained by contracting said second image information units read out of said image information storage and management means.

6. The method of claim 1 or 2, wherein said image information storage and management means stores and manages the relationships between image information units and their identifiers and the relationships of said image information units for each property, said first image information unit is provided from a source other than said image information storage and management means; and said step of reading out said second image information units from said image information storage and management means includes a step of checking the relationships of said image information units and their identifiers in said image information storage and management means and reading out therefrom a first identifier corresponding to said first image information unit, a step of checking said image information storage and management means for all second identifiers related directly with said first identifier and reading out said second identifiers, and a step of reading out image information units corresponding to said second identifiers, as said second image information units, from said image information storage and management means.

7. The method of claim 1 or 2 further comprising a step of selecting one of said navigators displayed on said display; a step of reading out an image information unit corresponding to said selected one of said navigators as a renewed first image information unit, from said image information storage and management means; and a step of displaying said renewed first image information unit, as a renewed main image, on said display.

8. The method of claim 1 or 2, wherein said first image information unit is an arbitrary one of a plurality of image information units which are read out from said image information storage and management means in a predetermined sequence.

9. The method of claim 1 or 2, wherein said first image information unit is generated on a transmitting side of an image information communication system, and said navigators and said generated first image information unit are displayed on said display provided on a receiving side of said image information communication system.

10. A navigator creating and display apparatus comprising:

image information storage and management means for storing and managing image information units related with one another in the order of their magnitudes defined for each property of each image;

a display for displaying a first image information unit as a main image; and a navigator generator for reading out of said image information storage and management means all second image information units adjoining said first image information unit in said directions and related therewith, processing said read-out second image information units to generate navigators indicating said second image information units, and supplying said navigators to said display;

said display being operative to display said navigators together with said main image for subsequent selection of one of said navigators.

11. The apparatus of claim 10, wherein said image information storage and management means includes an image information management device for storing and managing the relationships of image information units and their identifiers, and a relation management device for storing and managing the relationships of said image information units and their identifiers for each property.

12. The apparatus of claim 11, which further comprises image retrieval control means responsive to a selection of one of said navigators displayed on said display to supply a first identifier of an image information unit corresponding to said selected navigator to said navigator generator and to read out said corresponding image information unit, as a renewed first image information unit by use of said first identifier, and wherein said navigator generator is means which reads out of said relation management device all second identifiers adjoining in said directions and related with said first identifier supplied from said image retrieval control means, reads out of said image information management device, by use of said read out second identifiers, image information units corresponding to said second identifiers as new second image information units, and processes said new second image information units to form new navigators, said image retrieval control means supplying said renewed first image information unit and said new navigators to said display for display thereon.

13. The apparatus of claim 11, wherein said image information management device includes an image presentation management section for storing and managing a sequence of basic image information units assigned with identifiers, respectively, and an optional image information management section for storing and managing said identifiers of said basic image information units and said image information units as optional image information units, wherein said relation management device stores and manages relationships of said optional image information units to said basic image information units, as the relationships between said identifiers of said basic image information units and identifiers of said optional image information units, sequentially reads out said sequence of basic image information units from said image presentation management section and displays them one by one, as said main image, on said display, supplies said identifier of each of said basic image information units to said navigator generator to instruct it to generate at least one navigator related with said each basic image information unit, and supplies said at least one navigator to said display for display thereon.

14. The apparatus of claim 11, wherein said navigator generator and said image information storage and management means are provided on a transmitting side in an information communication system in which said transmitting side and a receiving side are interconnected via a communication channel, and said display is provided on said receiving side.

15. The apparatus of claim 14, wherein said transmitting side includes an input means for inputting an identifier of an image information unit to be transmitted, and image communication control means which read out an image information unit corresponding to said identifier, as said first image information unit, from said image information management device and sends said read-out image information unit to said receiving side, together with said navigators received from said navigator generator, and wherein said navigator generator reads out all identifiers adjoiningly related with said input identifier from said relation management device, reads out image information units corresponding to said read-out identifiers, as said second image information units, from said image information management device, and generates said navigators.

16. The apparatus of claim 14 wherein said transmitting side includes input means for inputting an image information unit to be transmitted, and image communication control means which supplies said input image information unit, as said first image information unit, to said navigator generator and sends said navigators received from said navigator generator and said first image information unit to said receiving side, and wherein said navigator generator creates said navigators corresponding to said second image information units received from said image communication control means and supplies said navigators to said image communication control means.

17. The apparatus of claim 11, wherein said navigator generator and said image information storage and management means are connected to a relaying communication processing unit in an information communication system in which transmitting and receiving sides are interconnected by said communication processing unit via a communication channel, and said display is provided on said receiving side.

18. The apparatus of claim 17, wherein said relaying communication processing unit supplies an image information unit transmitted from said transmitting side, as said first image information unit, to said navigator generator and sends said navigators received from said navigator generator and said first image information unit to said receiving side, and wherein said navigator generator creates said navigators corresponding to said all second image information units adjoiningly related with said first image information unit received from said relaying communication processing unit and supplies said navigators to said relaying communication processing unit.

19. The apparatus of claim 17, wherein said relaying communication processing unit supplies an identifier sent from said transmitting side to said navigator generator, reads out an image information unit corresponding to said received identifier, as said first image information unit, from said image information management device, and sends said read-out image information unit and said navigators received from said navigator generator to said receiving side, and wherein said navigator generator reads out all identifiers adjoiningly related with said received identifier from said relation management device, reads out image information units corresponding to all of said read-out identifiers, as said second image information units, from said image information management device, and creates said navigators.

20. The apparatus of claim 11, wherein said navigator generator, said image information storage and management means, and said display are provided on a receiving side in an information communication system in which a transmitting side and said receiving side are interconnected via a communication channel.

21. The apparatus of claim 20, wherein said receiving side includes image communication control means which supplies a received image information unit, as said first image information unit, to said navigator generator and supplies said navigators received from said navigator generator and said first image information unit to said display, and wherein said navigator generator creates navigators corresponding to all of said second image information units adjoiningly related with said first image information unit received from said image communication control means and supplies said navigators to said image communication control means.

22. The apparatus of claim 20, wherein said receiving side includes image communication control means which supplies a received identifier to said navigator generator, reads out an image information unit corresponding to said received identifier, as said first image information unit, from said image information management device, and supplies said read-out image information unit and said navigators received from said navigator generator to said display, and wherein said navigator generator reads out of said relation management device all identifiers adjoiningly related with said identifier received from said image communication control means, reads out image information units corresponding to said read-out identifiers, as said second image information units, from said image information management device, and creates said navigators.

23. The apparatus of claim 10, wherein said navigator generator includes image contracting means whereby said second image information units read out of said image information storage and management means are contracted to form displays of said navigators.

24. The apparatus of claim 10, 11, or 23, wherein said image information storage and management means includes registration information input means for inputting an image information unit to be registered, property management means for managing kinds of images and kinds of properties to be extracted for each of said kinds of images, and property extract means whereby, based on the kind of an image contained in the image information unit that is input from said registration information input means, a plurality of kinds of corresponding properties are read out of said property management means, and based on said kind of said image and said kinds of said properties, it is determined with which of the image information units in said image information storage and management means said input image information unit should be related.

* * * * *